Oct. 6, 1931.  J. R. MIDCAP  1,825,914

METAL CORNER BEAD WITH ATTACHMENT

Filed June 22, 1929

INVENTOR:
JOHN R. MIDCAP.
BY Hugh D. McCorkle
ATTORNEY.

Patented Oct. 6, 1931

1,825,914

UNITED STATES PATENT OFFICE

JOHN RAMEY MIDCAP, OF ST. LOUIS, MISSOURI

METAL CORNER BEAD WITH ATTACHMENT

Application filed June 22, 1929. Serial No. 373,031.

The invention relates to corner beads, and the principal objects of the improvement are to economize metal required in making the metal bead, and to provide for the convenient firm and rapid mounting thereof. The invention consists in the parts and combinations hereinafter described and illustrated in the accompanying drawings wherein like numerals refer to like parts wherever they occur.

Figure 5:
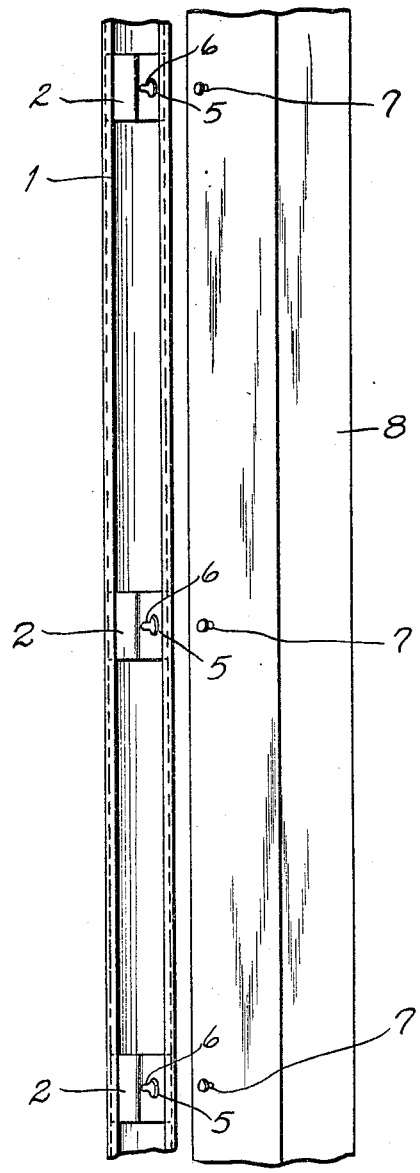
Fig. 5 is a back view of the corner bead, with the clips mounted therein ready to be secured to the nails or screws of the supporting structure.

My metal bead comprises a body portion 1, the metal clip 2, the wooden frame 8, the nail or screw head 7, the eyelet 5 opening into the slot 6, all in position ready to be attached to the frame, as appears in Fig. 5 of the drawings.

As shown 1 is a curved metal bead (though it may be straight or triangular) whose lateral edges are rebent to form an inside marginal groove (see 3 of Fig. 3) 2 is a metal clip bent to approximately a right angle whose outward edges are bent outward to make end flanges so made as to slide into and engage the groove in the metal bead 1, and it may be slid up or down to suit the positions of mail heads 7. On one side of the clip is an opening resembling an old time key hole, where a round hole or eyelet 5 large enough to slip over a nail or screw head 7 opens into a slot wide enough to pass the stem of the nail or screw, but too narrow to permit the heads to be pulled through it perpendicularly. 7 is the nail or screw head of nail or screw driven or screwed into the wooden frame in such manner that the head will project slightly above the surface.

Figure 1:
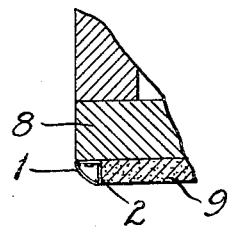
Fig. 1 is a horizontal sectional view through a structure showing my device mounted thereon.
Figure 2:
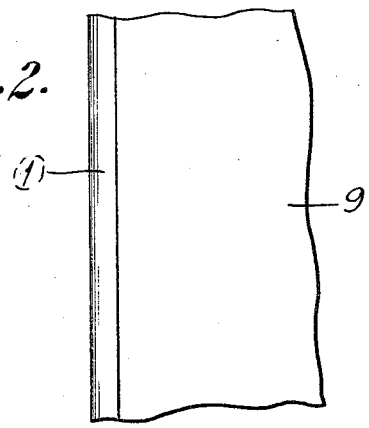
Fig. 2 is a fragmentary view of a wall having my corner bead mounted thereon.
Figure 3:
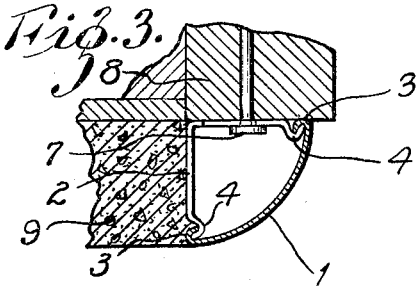
Fig. 3 is a horizontal view of a structure showing one form of my device mounted thereon.
Figure 4:
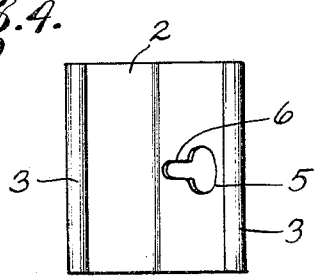
Fig. 4 is a detail view of my clip from the rear.

Fig. 3 shows the bead 1, the clip 2, and their manner of attachment to each other through the engagement of the flange 4 with the groove 3, and also the manner of attaching the combination to the nail 7 driven into the frame 8. It also shows how the plaster 9 is held by the corner bead. All along the bead 1 (see Fig. 5) the plaster is pressed into the projecting curved recess except where the clip impedes it, so that the end of the plaster body is locked into the bead in the same manner as with the beads in present use. The metal bead if made of thin metal is kept from springing out or giving by the metal clip 2 which holds it rigid against the plaster and the plasterer. These clips occur at regular intervals as shown in Fig. 5.

In use, the nail or screw is first driven or screwed to the frame perpendicularly from its surface, leaving the head projecting above the surface sufficiently to enable the metal clip to slip over its head upon which the slot is pushed under the head along the stem. In mounting the clips are first slipped into the bead, as many as may be necessary and slid along until opposite the heads 7, whereupon they are slipped over or buttoned on the heads as above described, and when pressed into the slots the bead is held firmly against the frame, with its open cavity or recess opening toward the wall to be plastered.

The metal bead in present use is made of a heavy metal strip about two inches wide with one edge bent backward to form a recess into which the plaster is pressed. This is attached to the frame by nails driven from behind at an acute angle to the side of the bead into which it is driven. If however, the bead is to be put on near a corner of the room there being no room to drive from behind, the fastening becomes a very slow and difficult task, sometimes taking the entire day of the workman to attach a single bead. It also frequently occurs that the nail driven into the frame at an angle passes through the corner of the wood and protrudes into the room. And in all cases the metal strip must be so thick and heavy that it will not spring outward when the plaster is being forced into the recess. Now metal beading is regarded as highly sanitary and is used in buildings where cost is not regarded as so important as sanitation and finish. But if the price of beading could be materially reduced, and the cost of labor decreased, it would become more general, and its benefits more widely diffused.

By the use of my invention two thirds of the metal is saved, since the bead is scarcely more than half as wide, and scarcely more than half the thickness of the bead in present use, the bead being held firmly by the clip. Almost half of the time of the mechanic is also saved, since the nail or screw is driven directly into the face of the frame, and no difficulty is experienced where it must be attached in the corner of the room.

The clip shown in the drawings is only one form of clip that may be used to effect its locking into the bead, and to make the attachment to the frame. The same result may be obtained by using a spring clip similar in form to the one shown but with no eyelet or slot. This clip may be nailed to the frame perpendicular to its face, and then the sides of the clip are pressed in until the flanges engage the groove 3, when they spring out and lock into the bead. Nor is it necessary that the bead be curved, for it may be straight or triangular in form, so long as its marginal grooves are so shaped as to engage the lateral flange of the clip.

What I claim is:—

1. A metal corner bead comprising a body portion, whose edges have inwardly opening grooves, in combination with angular metal clips whose ends are bent into outward flanges which engage the said grooves, one side of such clip having a button hole adapted to co-operate with headed fastening devices on the supporting structure.

2. In a metal bead construction, flexible metal clips of angular section, having one side only secured to a structure, with the other side left free to flex, and a metal body portion having inturned margins arranged to engage the ends of said clips, whereby said body portion may be mounted on said clips after said clips are mounted into permanent position.

3. A metal corner bead comprising a body portion whose edges have inwardly opening grooves, in combination with angular metal clips having end flanges engaging said grooves, and having an eyelet from which opens a slot, to press over a perpendicular headed nail bolt or screw driven into the supporting structure, so as to securely mount the whole on the supporting structure.

JOHN RAMEY MIDCAP.